No. 858,563. PATENTED JULY 2, 1907.
B. J. BLAMEUSER.
GALVANIC BATTERY.
APPLICATION FILED JAN. 20, 1906.
2 SHEETS—SHEET 1.
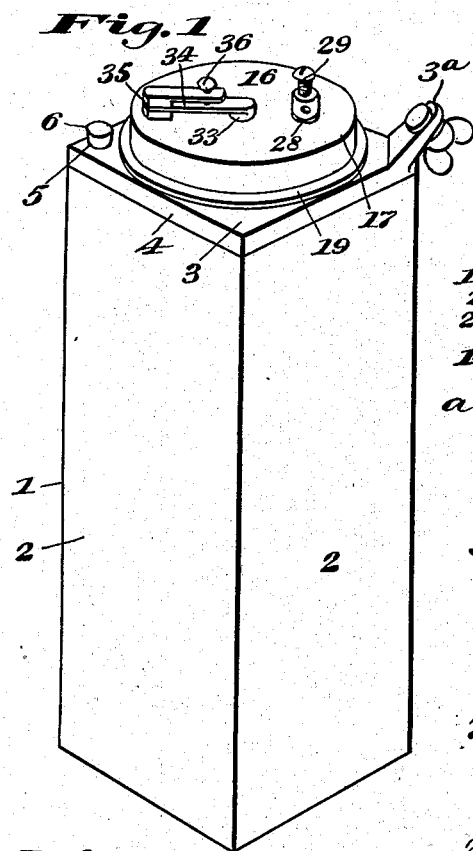
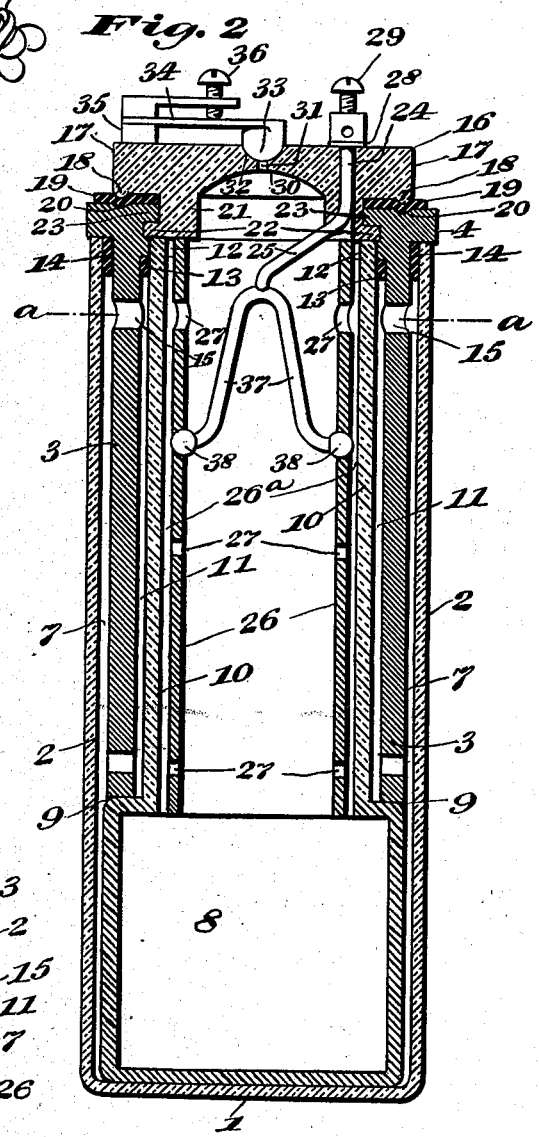
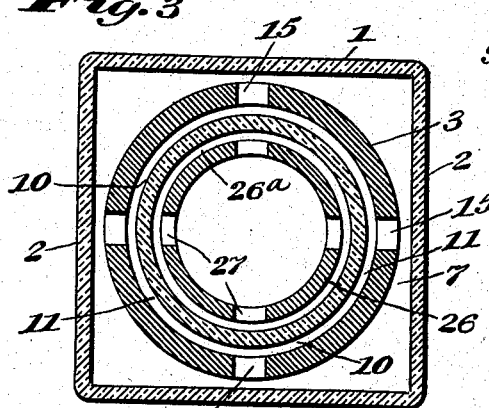
WITNESSES:
INVENTOR
Benjamin J. Blameuser.
BY
Chas. C. Tillman
Attorney No. 858,563. PATENTED JULY 2, 1907.
B. J. BLAMEUSER.
GALVANIC BATTERY.
APPLICATION FILED JAN. 20, 1906.
2 SHEETS—SHEET 2.
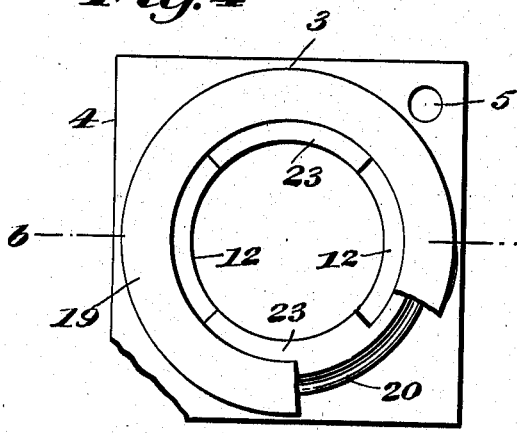
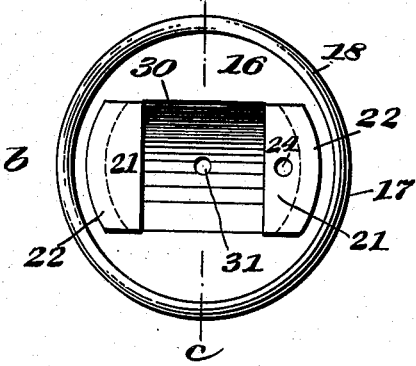
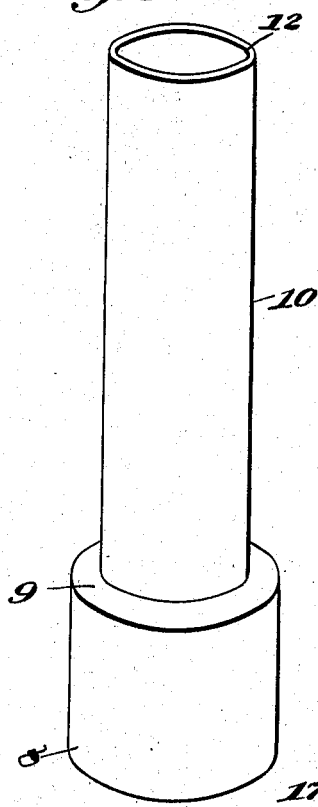
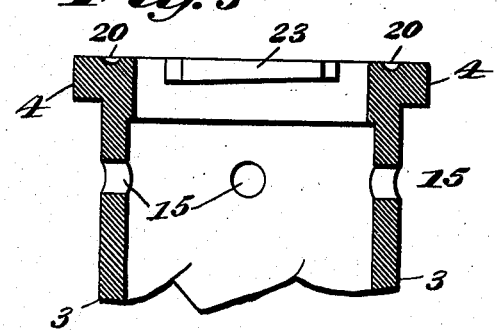
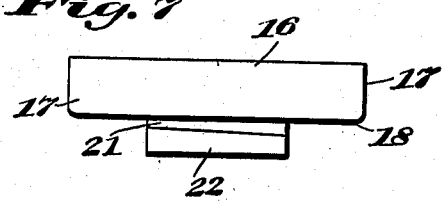
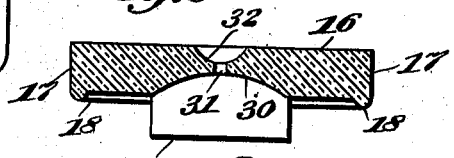
WITNESSES:
INVENTOR
Benjamin J. Blameuser.
By Chas. C. Gillman
Attorney

UNITED STATES PATENT OFFICE.

BENJAMIN J. BLAMEUSER, OF CHICAGO, ILLINOIS.

GALVANIC BATTERY.

No. 858,563.      Specification of Letters Patent.      Patented July 2, 1907.

Application filed January 20, 1906. Serial No. 296,977.

*To all whom it may concern:*

Be it known that I, BENJAMIN J. BLAMEUSER, a citizen of the United States, residing at Chicago, Cook county, Illinois, have invented certain Improvements in Galvanic Batteries, of which the following is a specification.

This invention relates to certain improvements in galvanic batteries and more particularly in that class of batteries wherein depolarizing compounds are provided for combination with the nascent hydrogen evolved during chemical action, and the object of the invention is to provide a battery of this general character of a simple and inexpensive nature and of a compact and light construction which shall be adapted to afford, during use, comparatively high efficiency with relation to its bulk and shall be adapted to be sealed up so as to prevent derangement of its elements or spilling of its solutions, means of an improved and simplified character being provided for permitting the escape of gas so that the same is prevented from accumulating during use of the battery and lessening the efficiency of the cell.

The invention consists in certain novel features of the construction and combinations and arrangements of the several parts of the improved battery, whereby certain important advantages are attained and the device is rendered simpler, cheaper and otherwise better adapted and more convenient for use, all as will be hereinafter fully set forth.

The novel features of the invention will be carefully defined in the claims.

In the accompanying drawings which serve to illustrate the invention—Figure 1 is a perspective view showing a battery embodying my improvements; Fig. 2 is an axial section taken vertically through the improved cell and showing the elements thereof in relation, the fluids of the cell being, however, omitted; Fig. 3 is a transverse section taken horizontally through the upper part of the improved cell in the plane indicated by the line $a$—$a$ in Fig. 2; Fig. 3$^a$ is a fragmentary sectional view showing a modified formation of the zinc element comprised in my invention; Fig. 4 is a partial plan view showing the carbon element of the battery detached, and showing the arrangement thereon of the gasket or packing for sealing the joint between said carbon element and the insulating holder for the zinc element; Fig. 5 is a sectional view taken transversely and vertically through the upper part of the carbon element detached, the section being taken in the plane indicated by line $b$—$b$ in Fig. 4; Fig. 6 is an underside view of the insulating holder for the zinc element and showing the means carried thereby for holding said part in relation to the carbon element; Fig. 7 is a side elevation of said insulating holder for the zinc element; Fig. 8 is a section taken transversely and vertically through said holder in the plane indicated by line $c$—$c$ in Fig. 6, and— Fig. 9 is a perspective view, showing the receptacle for the active solution of the battery.

In these views 1 represents a jar or container, which may be made from glass, earthen-ware or other material and which is herein shown as rectangular in cross-section so that its four sides 2, 2 are made flattened. By this construction of the container it will be evident that a number of cells may be packed closely together with their flattened sides flush one on the other so as to occupy much less space than would be required for cells having cylindrical containers in the ordinary way. This construction of the container affords a material advantage, but I do not desire to be understood as limiting myself to such form as it is evident that, when desired, cylindrical containers may be employed.

3 represents, as a whole, the carbon or electro-negative element of the improved battery and which has a cylindrical hollow body portion depending within the container 1, said element being provided with a projecting flange 4 at its upper part, which flange is made in rectangular form and is adapted to rest upon the upper edge of the container as shown in Figs. 1 and 2. The diameter of the cylindrical body portion of the element 3 is such that a space 7 is afforded within said container and surrounding said cylindrical shell of the carbon element, and the flanged upper part 4 of the element has at one corner, an opening 5 affording access to said space 7 so that the depolarizing solution may be poured therein as will be presently explained. Said opening 5 is designed to be tightly closed, after the space 7 has been filled with solution by means of a plug or stopper 6.

3$^a$ is a binding post carried at one corner of the flanged upper part of element 3 for attachment of a circuit conductor thereto in a well known way.

8 is a cylindrical receptacle adapted to contain the active solution or electrolyte which may be a dilute solution of sulfuric acid, for example, and said receptacle has an enlarged lower part which is made with substantially the same diameter as the cylindrical shell of the carbon element and is adapted to be rested upon the bottom of the container 1. The cylindrical body portion of the carbon element 3 is of less height than the container 1, so that its lower edges rest upon the annular shoulder 9 afforded at the top of the enlarged lower portion of receptacle 8 above described, and said enlarged lower part of said receptacle is made with non-porous walls so that the electrolyte contained therein is prevented from permeating said walls and escaping into the lower part of the space 7 outside said receptacle and at the base of the container. Above the enlarged lower portion of the receptacle which is thus formed with non-porous walls as above stated, said receptacle has a cylindrical portion 10 of less diameter which is formed from porous material and is extended up within the cylindrical body portion of the carbon element 3, forming a porous partition or cup separating said carbon element from the electro-positive or zinc element which as will be presently described, is held within said porous cup and exposed to the action of the electrolytic solution within the receptacle. The receptacle 8 may be conveniently formed from earthen-ware, its lower enlarged portion being glazed to render it non-porous or impervious to the electrolyte, while its upper reduced portion 10 is left unglazed so that the solutions may freely permeate it. The same result may be attained by forming the receptacle entirely from porous material and dipping the enlarged lower part thereof in molten paraffin or the like.

The cylindrical reduced upper part 10 of the receptacle 8 is made in less diameter than the internal diameter of the cylindrical shell of the carbon element 3, so that an annular space or chamber 11 is produced between said parts within said cylindrical shell of the carbon element and the upper part of said shell has suitably arranged apertures 15 produced within it for the passage of the depolarizing solution from the outer space 7 in the container into said chamber 11 between element 3 and the porous wall 10 of the receptacle 8.

In practice, I prefer to unite the carbon element with said receptacle 8 so that these parts may form, to all intents one part or section of the battery, and I preferably accomplish this result by extending the upper edge portion 12 of the receptacle 8 within the central opening at the upper part of element 3, cement being applied between the parts as shown at 13 for holding said parts in relation. In a similar way cement may also be employed between the parts at the lower edge of element 3 for holding the same upon the shoulder 9 of the receptacle. When the parts 3 and 8 have been thus united, they are placed in the container 1 and the joint between the upper part of the shell of element 3 and the wall of the container is also closed by means of cement as seen at 14 on the drawings so that a tight joint is provided to prevent escape of liquid or gases.

The upper end of carbon element 3 is provided with a circular opening at its center as above stated and the zinc or electro-positive battery element is insertible and removable at said opening, being carried on a cap or cover 16 made in circular form from glass, paraffined wood or other insulating material and of a diameter such that its edge portions 17 overlap the sides of the circular opening in the carbon element and rest on the upper surface thereof outside said circular opening as seen in Fig. 2. The lower face of the cap or cover 16 has a marginal downwardly extended rib 18 adapted, when the parts are assembled, to correspond in position above an annular groove or channel 20 in the top face of the carbon element 3, and an elastic or compressible packing or gasket 19 is interposed between the parts and is forced by rib 18 into groove 20 to form a tight joint between the parts.

The cap or cover 16 has downwardly extended parts or lugs 21 which are adapted, when the parts are assembled, to enter the circular opening at the top of the carbon element and said lugs or parts 21 are provided with outwardly directed portions 22 having cam surfaces at their upper sides adapted, when the cap or cover is turned relative to said carbon element 3, to engage beneath corresponding cam surfaces produced at the lower sides of inturned projections 23, 23, integrally produced on the element 3 at opposite sides of its opening as clearly shown in Figs. 2, 4 and 5. By this construction it will be seen that when the compressible gasket or packing ring 19 has been laid on the grooved surface of element 3 and the cap or cover 16 is applied over the circular opening at the top of said element with its lugs 21 depending in said opening, the turning of the cap or cover relative to element 3 will serve to engage the cam projections of the respective parts whereby the cap or cover will be drawn down tightly toward element 3, compressing gasket 19 to produce a tight joint effectively preventing escape of liquid or gases between the parts even though the cell be overturned.

24 is a bore or passage extended vertically through the insulating zinc holder formed of cap or cover 16, and 25 is a connection or hanger for the zinc element 26 in the form of a stem passed through the bore or passage 24 and having at its upper end a washer or gasket 28 pressed tightly on the top of the cap to prevent the escape of liquid or gases around the stem. 29 is a binding post on the upper end of the stem, above the gasket or washer 28 and affording connection of a circuit conductor with the zinc element 26. Said zinc element is herein shown formed from a zinc cylinder the upper edge of which is pressed securely against the under face of the lugs 21, 21 of the cap or cover. Said cylinder 26 has openings 27 formed in its walls at suitable intervals and the lower end of stem 25 carries a forked holder 37, having divergent spring arms protected from the electrolytic solution by a suitable insulating covering and having rounded end portions 38 which are bared and are adapted for detachable engagement in certain of the openings 27 in element 26 as shown in Fig. 2, for supporting said zinc element from the cap or cover with its upper edge pressed upon lugs 21 thereof. The stem or hanger 25 thus serves not merely as an electrical circuit connection for the zinc element but also connects the said element with the cap or cover so that said element may be removed from the cell when said cap or cover is removed, the zinc cylinder being of a size to conveniently pass through the circular opening at the top of the carbon element 3. In this way it will be understood that the cap or cover, carrying with it said zinc element, may be removed conveniently from the cell to permit the same to be cleansed and renewed from time to time or when run down and owing to the detachable connection of the arms of the holder 37 with said zinc element, it is evident that by pressing said arms toward each other, their ends may be disengaged from the openings in the zinc element when the same is worn out permitting the worn element to be removed and replaced by a fresh one, which when held to the cap or cover by the engagement of the holder arms with its openings 27, may be passed down through the opening of element 3 into the interior of the cell, whereupon, after turning the cap or cover to engage its cam projections with those of the carbon element, the cell will again be sealed and ready for renewed use.

In Fig. 3ᵃ I have shown a modified formation of the zinc element wherein the same is formed from thin sheet zinc rolled in cylindrical form with a four-ply seam or lap 25ᵃ at each side. Where this construction is employed, the lap joints at opposite sides of the cylinder give an increased thickness of metal at which openings 38ᵃ may be provided to receive the bare rounded extremities of the elastic arms of the zinc holder 37. The cylindrical zinc element 26 carried on the cap or cover 16 is arranged to depend, when the parts are assembled, as seen in Fig. 2, within the cylindrical porous upper part 10 of the receptacle 8 wherein the electrolytic solution is contained, said zinc element being of less diameter than the internal diameter of said porous wall 10 of the receptacle, so that an annular space or chamber is provided as shown at 26ª surrounding the zinc element and adapted to receive the active solution. The openings 27 afford communication from the interior of element 26 to the chamber or space 26ª surrounding said element so that the electrolytic solution within said element may circulate through said openings into chamber 26ª to maintain a substantially uniform strength of the electrolyte in chamber 26ª during the life of the battery. A comparatively large supply of the electrolyte is carried by the receptacle and in service it will be understood that as the solution is neutralized by action on the zinc element in the surrounding chamber 26ª, it will become heavier and consequently will sink to the bottom of the receptacle, being replaced by the fresh solution from within the zinc element.

In order to provide against excessive rise of pressure within the cell from the generation of gas during service, I provide the cell with a valved gas outlet or vent, which I will now describe: The underside of the cap or cover 16, between the lugs 21, 21 is made with an upwardly extended dome-like surface or cavity 30, in which the gas generated in the cell may collect and at the apex of said recess, a vent aperture 31 is produced in the cap or cover, being surrounded by a valve seat 32 at the top surface of the cap or cover. 33 is a valve arranged to fit said seat 32 and carried by a spring or elastic stem 34 attached at 35 to one side of the cap or cover. 36 is a set screw carried by an arm overhanging the stem 34 of valve 33 and by means of which the spring tension of said stem may be regulated at will. By this arrangement, when the pressure of gas within the cell rises too high, the valve 33 will be automatically lifted from its seat to allow the excess of gas to escape at the duct or vent 31, whereby the pressure in the cell will be reduced so that the valve 33 may again seat itself to prevent escape of fluid from the cell.

The improved galvanic battery constructed as above described is of an extremely simple and inexpensive nature and is especially well adapted for use by reason of the compactness of its arrangement and also by reason of the fact that the cell, when in use is hermetically sealed so that even if upset, no fluid can be spilled therefrom. Also since the receptacle 8, carbon element 3 and container 1 are fixedly connected with each other as above stated so as to form substantially but a single part or section and the cap or cover 16 and the zinc element are also connected with each other by means of the conducting stem of the zinc element so as to form substantially a single part or section, it will be seen that the assembling of the parts in charging or renewing the battery is much simplified and can be conveniently and quickly accomplished by an unskilled person.

If desired, the salts for the active and depolarizing solutions may be placed in a dry state in the receptacle 8 and space 7, respectively, previously to sealing the carbon element to the container, and when this is done, it is only necessary to fill the interior of the cell with water sufficient to dissolve such dry salts, such water being poured through the opening 5 in flange 4 and through the central opening at the top of the carbon element.

From the above description of my improvements it will be seen that the improved cell is capable of considerable modification without material departure from the principles and spirit of the invention and for this reason I do not desire to be understood as limiting myself to the precise form and arrangement of the several parts herein set forth in carrying out my invention in practice. Nor do I desire to be understood as limiting myself to the employment of carbon and zinc exclusively for the elements of the battery since it is evident that other substances may be substituted therefor when desired.

Having thus described my invention, what I claim and desire to secure by Letters Patent is—

1. A galvanic battery comprising a container, a battery element having a hollow body portion pendent in the container and provided with an opening at its top communicating with the hollow of its body portion, a receptacle in the container and having a laterally enlarged lower part whereon the lower edges of the body portion of said element are rested, said receptacle being also provided with a hollow porous cylindrical part extended up from said enlarged lower part and within the hollow body portion of said element, a cap or cover of insulating material to close the opening at the top of said element and a battery element carried by the cap or cover and pendent through said opening within the porous cylindrical upper part of the receptacle.

2. A galvanic battery comprising a container, a battery element having a hollow body portion pendent in the container and provided with an opening at its top communicating with the hollow of its body portion, a receptacle in the container and having an enlarged non porous lower part whereon the lower edge of the hollow body portion of said element is rested, said receptacle being also provided with a hollow porous cylindrical part extended up from the enlarged lower part within the hollow body portion of said element, means for connecting the upper edge of said porous cylindrical part of the receptacle to the upper part of said element, a cap or cover of insulating material to close the opening at the top of said element and another battery element carried by the cap or cover and pendent through said opening within the porous cylindrical upper part of the receptacle.

3. A galvanic battery comprising a container and having an opening at its top, a cap or cover to close said opening, a battery element having openings formed through it and adapted, when carried by the cap or cover, to depend through said opening within the container and a holder carried on the cap or cover and comprising divergent spring arms the extremities of which are adapted for detachable engagement with openings in said battery element.

BENJAMIN J. BLAMEUSER.

Witnesses:
CHAS. C. TILLMAN,
M. A. NYMAN.